United States Patent Office 2,873,281
Patented Feb. 10, 1959

2,873,281

PREPARATION OF BIS-QUATERNARY AMMONIUM COMPOUNDS

William Edward Rosen, Summit, N. J., assignor to Ciba Pharmaceutical Products, Inc., Summit, N. J., a corporation of New Jersey No Drawing. Application July 5, 1957
Serial No. 669,979

3 Claims. (Cl. 260—319)

This invention relates to a new process of the preparation of the dimethochlorides of 2-tertiary amino-lower alkyl - benz - polychloroisoindolines. Benz - polychloro derivatives contain 3 or especially 4 chlorine atoms attached to the benzene portion of the isoindoline molecule. The tertiary amino group of the tetiary amino-alkyl side chain may be di-substituted by lower alkyl radicals, or substituted by a lower alkylene radical which may contain oxygen or nitrogen atoms as chain members, thus form oxaalkylene or azaalkylene radicals. Preferred as substituents of the amino group are lower alkyl radicals, e. g. methyl, ethyl or propyl.

Especially contemplated by this invention is the preparation of the dimethochlorides of 2-(N,N-di-lower alkyl - amino - lower alkyl) - benz - polychloro - isoindolines, such as for example, 4,5,6,7-tetrachloro-2-(2-dimethylaminoethyl) - isoindoline dimethochloride, 4,5,7-trichloro - 2 - (2 - dimethylaminoethyl) - isoindoline dimethochloride or 4,5,6,7 - tetrachloro - 2 - (2 - diethylaminoethyl)-isoindoline dimethochloride.

Isoindolines of the above-mentioned type, especially the derivatives containing a 4,5,6,7 - tetrachloro - isoindoline ring, such as the 4,5,6,7-tetrachloro-2-(2-dimethylaminoethyl)-isoindoline dimethochloride of the formula:

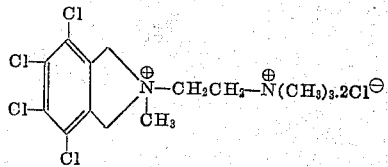

are known compounds. They are useful as ganglionic blocking agents and can be employed in the treatment of hypertension.

In the course of investigations concerning suitable processes for the preparation of a dimethochloride of 2-tertiary amino-lower alkyl-benz-polychloro-isoindolines, it has been found that by treating the bases in the usual manner with methylchloride, only mixtures of the bis-quaternized and the mono-quaternized products are formed, whereby the main product usually consists of the corresponding undesired monomethochloride. The yield of the dimethochloride can be improved to some extent by running the process in a closed vessel under pressure and at an elevated temperature. However, the formation of the mixture cannot be avoided and the separation of the mono-quaternary compound from the therapeutically active bis-quaternary compound is a tedious, difficult and expensive process.

A further process by which acceptable yields of the bis-quaternary chloride compounds can be obtained consists in converting a dimethiodide, obtainable by reacting a benz-polychlorinated 2-tertiary amino-lower alkyl-isoindoline with methyliodide in methanolic solution, into the corresponding dimethochloride by treatment of an aqueous solution of the dimethiodide with silver chloride or with an anhydrous methanolic solution of hydrogen chloride. This process has several disadvantages inasmuch as an additional step is involved and as the expensive and not recoverable methyliodide must be used for the preparation of the intermediate dimethiodide. The conversion of the corresponding dimethobromide into the dimethochloride according to the same procedures does not give satisfactory yields.

I have now found that excellent yields in the preparation of pure dimethochlorides of 2-tertiary amino-lower alkyl-benz-polychloro-isoindolines can be obtained by treating in a closed vessel a solution of a 2-tertiary amino-lower alkyl-benz-polychloro-isoindoline or its monomethiochloride in formamide with an excess of methylchloride at an elevated temperature.

The reaction is preferably carried out at an elevated temperature of about 50 to 200° C. Depending on the conditions of the reaction, e. g. temperature or excess of methylchloride, the pressure built up in the closed vessel by the reaction ranges from about 20 to 500 p. s. i. The quaternizing reagent methylchloride is used in an excess amount ranging from about 50 percent upwards, a 250 percent excess being preferred. The upper limit is controlled by economical reasons since the reaction is pushed to completion by any higher excess of the methylchloride.

The starting materials used in the reaction are known or can be prepared according to known methods. Thus, 2 - tertiary amino-lower alkyl - benz - polychloro - isoindolines, for example, the 4, 5, 6, 7-tetrachloro-2-(N,N-di - lower alkyl - amino - lower alkyl) - isoindolines, are conveniently prepared by heating either with or without a solvent, e. g. acetic acid, a mixture of 3,4,5,6 - tetrachlorophthalic acid anhydride with an excess of a N,N-di-lower alkyl-amino-lower alkylamine to give the 3,4,5, 6 - tetrachloro - 1 - (N,N - di - lower alkyl - amino-lower alkyl)-phthalimide which by hydrogenation, for example by treatment with lithium aluminum hydride, yields the desired 2-tertiary amino-lower alkyl-isoindoline used as the starting material. The same compounds can also be made, for example, by treating potassium 3,4, 5,6-tetrachloro-phthalimide in a solvent, e. g. dimethylformamide, with an N,N-di-lower alkyl-amino-lower alkyl halide, followed by reduction of the 3,4,5,6-tetrachloro-1-(N,N-di-lower alkylamino-lower alkyl)-phthalimide as indicated above. The reduction to the corresponding isoindoline derivative may also be carried out electrolytically.

Monomethochlorides which may also be used as starting materials can be prepared, for example, by treating 2-tertiary amino-lower alkyl-benz-polychloro-isoindolines such as the 4,5,7-trichloro-2-(N,N-di-lower alkyl-amino-lower alkyl)-isoindolines with methylchloride under conditions used in an ordinary quaternization reaction, i. e. at normal or slightly elevated temperatures and/or at normal pressure and/or in an an alcoholic solution, e. g. methanol, so that only the amino group of the tertiary amino-lower alkyl side chain is quaternized.

This application is a continuation-in-part application of my application Serial No. 607,582, filed September 4, 1956 (now abandoned).

The following examples are intended to illustrate the invention. They are not to be construed as being limitations thereon. Temperatures are given in degrees centigrade.

Example 1

11 g. (0.22 mole, 150% excess) of methylchloride is added to a Dry Ice-chilled suspension of 13.9 g. (0.043 mole) of 4,5,6,7-tetrachloro-2-(2-dimethylaminoethyl)-isoindoline and 13.9 ml. of formamide in a glass-lined pressure bomb. The reaction mixture is heated at 90 to 100° with shaking for five hours. The cooled reaction mixture is vented, diluted with 139 ml. of acetone and chilled to —5°. The pink solid is collected, washed with acetone and dried under reduced pressure, giving 20.46 g. of a product melting at 245–250° (with decomposition). This product is the 4,5,6,7-tetrachloro-2-(2-dimethylaminoethyl)-isoindoline dimethochloride contaminated with a small amount of the corresponding monomethochloride. The latter can be removed by several recrystallizations of the product obtained from absolute ethanol.

*Example 2*

A suspension of 32.8 g. (0.10 mole) of 4,5,6,7-tetrachloro - 2 - (2 - dimethylaminoethyl) - isoindoline in 32.8 ml. of formamide is chilled in Dry Ice, and 30.3 g. (0.60 mole, 200% excess) of methylchloride is added. The reaction mixture is treated as described in Example 1, yielding 49.2 g. of the 4,5,6,7-tetrachloro-2-(2-dimethylaminoethyl - isoindoline dimethochloride, containing only a trace of monomethochloride, which can be identified by paper chromatography. The monomethochloride can be removed by several recrystallizations from absolute ethanol.

*Example 3*

A mixture of 32.8 g. (0.10 mole) of 4,5,6,7-tetrachloro - 2 - (2 - dimethylaminoethyl) - isoindoline and 32.8 ml. of formamide in a pressure bomb glass liner is chilled in Dry Ice. After the addition of 35.3 g. (0.70 mole; 250% excess) of methylchloride, which had been prechilled in Dry Ice, the glass liner is placed into the pressure bomb and is warmed over the period of one hour to 90 to 100°. The temperature is maintained at that level with shaking for five hours. The mixture is then cooled rapidly to room temperature and the tan-colored product cake is diluted with 328 ml. of acetone while stirring and then chilled to —5°. The white crystalline solid is collected and washed three times with acetone. It is dried several days under reduced pressure at 60°, yielding 51.0 g. of 4,5,6,7-tetrachloro-2-(2-dimethylaminoethyl)-isoindoline dimethochloride, M. P. 246–254° (with decomposition). A paper chromatogram (sensitive to 1%) shows no trace of the corresponding monomethochloride. After one recrystallization from ethanol, the melting point of the product rises to 264–266°.

*Example 4*

A chilled mixture of 14.0 g. (0.043 mole) of 4,5,6,7-tetrachloro - 2 - (2 - dimethylaminoethyl) - isoindoline, 14.0 ml. of formamide, and 25.8 g. (0.51 mole, 500% excess) of methylchloride in a glass-lined pressure bomb is treated as described in Example 1. A first crop of 20.79 g. of white 4,5,6,7-tetrachloro-2-(2-dimethylaminoethyl)-isoindoline dimethochloride is obtained, M. P. 251–254° (with decomposition), which contains no detectable amounts of monomethochloride. After one recrystallization from ethanol, the melting point of the product rises to 264–266°.

*Example 5*

A mixture of 2.0 g. of 4,5,6,7-tetrachloro-2-(2-diethylaminoethyl)-isoindoline and 2.0 g. of methylchloride (250% excess) in 2.0 ml. of formamide is heated in a pressure apparatus to 90–100° for 5 hours with shaking. After cooling and venting, the dark solution is diluted with 20 ml. of acetone and chilled at —5° for several hours. 1.8 g. of the crude dimethochloride of 4,5,6,7-tetrachloro - 2 - (2 - diethylaminoethyl) - isoindoline is obtained which melts after recrystallization from ethanol at 202–208°.

*Example 6*

A prechilled mixture of 1.70 g. of 4,5,7-trichloro-2-(2-dimethylaminoethyl)-isoindoline, 1.70 g. of formamide and 2.1 g. of methylchloride (250% excess) is placed into a pressure bomb and heated for 5 hours to 90–100° with shaking. After cooling and venting, the reddish-brown solution is diluted with 17 ml. of acetone and chilled. The dimethochloride of 4,5,7-trichloro-2-(2-dimethylaminoethyl)-isoindoline is filtered off to give 1.89 g. of dried material which is recrystallized from 95% ethanol, M. P. 193–198°.

What is claimed is:

1. Process for the preparation of 2-(N,N-di-lower alkyl-amino-lower alkyl)-benz-polychloro-isoindoline dimethochlorides which comprises treating in a closed vessel a solution of a member of the group consisting of a 2 - (N,N - di - lower alkyl - amino - lower alkyl) - benz-polychloro-isoindoline and the corresponding monomethochloride in formamide with an excess of methylchloride at an elevated temperature.

2. Process for the preparation of 4,5,6,7-tetrachloro-2 - (2 - N,N - di - lower alkyl - amino - ethyl) - isoindoline dimethochlorides which comprises treating in a closed vessel a solution of a 4,5,6,7-tetrachloro-2-(2-N,N - di - lower alkyl - amino - ethyl) - isoindoline in formamide with an excess of methylchloride at an elevated temperature.

3. Process for the preparation of the 4,5,6,7-tetrachloro - 2 - (2 - dimethylaminoethyl) - isoindoline dimethochloride which comprises treating in a closed vessel a solution of 4,5,6,7 - tetrachloro - 2 - (2 - dimethylaminoethyl)-isoindoline in formamide with an excess of about 250% of methylchloride at an elevated temperature of about 50 to 200°.

References Cited in the file of this patent

UNITED STATES PATENTS

| | | |
|---|---|---|
| 2,582,748 | Croxall | Jan. 15, 1952 |
| 2,740,795 | Wenner | Apr. 3, 1956 |